Patented Aug. 21, 1928.

1,681,751

UNITED STATES PATENT OFFICE.

HENRY HERMAN STORCH, OF NEW YORK, N. Y., ASSIGNOR TO THE ROESSLER & HASSLACHER CHEMICAL COMPANY, OF NEW YORK, N. Y., A CORPORATION OF NEW YORK.

SYNTHESIS OF METHANOL.

No Drawing. Application filed May 16, 1927. Serial No. 191,925.

This invention relates to the synthesis of methanol from hydrogen and carbon monoxide, and has for its object the preparation and use of catalysts suited for this synthesis which will give high activities for extended periods.

My new catalysts for this synthesis are composed of copper and a fluoride of one of the metals of the group consisting of calcium, barium, strontium and magnesium. These catalysts may be utilized in any methanol synthesis system, and excellent yields are obtained for extended periods.

Examples of catalysts of this class are $Cu + CaF_2$, $Cu + BaF_2$ or $Cu + MgF_2$. These were prepared as follows:

I. $Cu + CaF_2$: — 4.5 parts by weight of $Ca(NO_3)_2.4H_2O$ and 4.5 parts by weight of $Cu(NO_3)_2.3H_2O$ were dissolved in 37.5 parts by weight of distilled water. Into this solution, with constant stirring was poured a second solution consisting of 4.5 parts by weight of potassium fluoride and 2.25 parts by weight of potassium hydroxide in 37.5 parts by weight of distilled water. This mixture was now boiled for 3 hours, then filtered on a suction filter and the precipitate washed free of alkali metal salts with distilled water. The filter cake was dried at 150°–200° C. and then reduced. When dried the mixture forms black, hard masses which can be granulated and screened to any desired size, e. g. 20 mesh, before reduction.

The reduction can be carried out by any suitable means, such as passing hydrogen, or mixtures of hydrogen with carbon monoxide or methanol or both over the heated mass. In order to prevent large, uncontrollable increases in temperature during reduction it is usually desirable to dilute the reducing gas with nitrogen or any other inert gas. For example, a satisfactory reducing mixture is 5 volumes of methyl alcohol vapor, and 95 volumes of nitrogen. This reducing mixture is passed at atmospheric pressure over the dried precipitate preferably contained in a copper lined vessel and heated to not over 350° C. and preferably to about 150-200° C.

This reduced mass is my catalyst and is composed of reduced copper intimately mixed with calcium fluoride. In the example above described the catalyst is in the form of hard somewhat brittle granules.

II. $Cu + BaF_2$: — 1.6 parts by weight of $Cu(NO_3)_2.3H_2O$ were dissolved in 10 parts by weight of water; to this solution was added 0.2 parts by weight of $BaCO_3$ followed by sufficient nitric acid to cause the solution of all of the carbonate. 0.4 parts by weight of medium fibred, acid-washed asbestos was now added. About 0.37 parts of potassium fluoride as a saturated aqueous solution was now added to convert all of the barium nitrate to barium fluoride. A small excess of potassium hydroxide over that required for complete precipitation was now added as a 50% aqueous solution with thorough stirring and the mixture boiled for about 2 hours. The precipitate and carrier were then filtered out, washed, dried and subjected to reduction as in the previous example. This forms a mixture of copper and barium fluoride on an asbestos support.

III. $Cu + MgF_2$: — 70 parts by weight of magnesium oxide and 140 parts by weight of $Cu(NO_3)_2.3H_2O$ were dissolved in 1000 parts distilled water containing nitric acid equivalent to the amount of MgO used. A solution of 480 parts potassium fluoride in 1000 parts of water was now stirred in, and followed by 65 parts of potassium hydroxide in 200 parts of water. In this case the separate precipitation of the $MgF_2$ is necessary owing to the fact that it is more soluble than $Mg(OH)_2$. This mixture was boiled about ½ hour. The precipitate was then filtered out, washed, dried at about 150° C. and reduced as in the case of Example I, giving a hard, somewhat brittle catalyst mass composed of copper and magnesium fluoride.

It is to be noted in Example II that acid washed asbestos was utilized as a carrier for the catalyst. Similarly calcined or freshly precipitated magnesia, silica, and other suitable carriers can be utilized to form supports. I have found that carriers can be dispensed with, and the powdered or granulated catalyst as produced in I and III may be used. I have also found it advantageous, when no support is used, to compress powdered catalysts into the form of pills. This pill formation is preferably carried out with the unreduced precipitate after which the pills are subjected to the reducing action. These pills may be of any convenient size. I have found that pills about one-fourth inch in diameter and one-eighth inch thick give good results.

After reduction the above catalysts may be used for the synthesis of methanol. In employing the catalysts for this purpose it is desirable to use gases substantially free from the common catalyst poisons which may be present in the raw materials, such as, for example, arsenic, sulphur, phosphorous, volatile iron compounds or other deleterious constituents gathered during the gas production.

As an example of the use of such a catalyst the following is given:

A $Cu+CaF_2$ catalyst prepared as in Example I was placed in a copper lined pressure vessel and heated to between 300° C.–330° C. A gas mixture consisting essentially of about 4 volumes of hydrogen to 1 volume CO, containing none or very little of sulphur, phosphorous, arsenic, volatile iron compounds etc. was passed through the heated catalyst under a pressure of about 200 atmospheres and at a rate corresponding to a space velocity per hour (S. V. H.) of about 6,750 cubic feet of gas per cubic foot of catalyst per hour, calculated with the gas volume reduced to conditions of normal temperature and pressure, (N. T. P. — one atmosphere and 0° C.) a space time yield (S. T. Y.) equivalent to approximately 1,535 pounds of methanol per cubic foot of catalyst per 24 hours was obtained. The percent conversion of carbon monoxide to methanol was about 54% of that passed through. If the S. V. H. is increased the S. T. Y. increases and the percent conversion of CO to methanol decreases. The methanol was recovered by cooling the off-gases under pressure. The product was about 95–98% methanol.

This catalyst was also prepared in pill form before reduction, as described above, reduced, and utilized under similar conditions; somewhat higher yields were obtained.

$Cu+MgF_2$ gives under similar conditions about the same yields as the $Cu-CaF_2$ above.

A further example is that of the $Cu+BaF_2$ catalyst. With a gas as above and an S. V. H. of 5000 under conditions otherwise similar to those used with the $Cu-CaF_2$ catalyst an S. T. Y. of 400 pounds was obtained.

I do not in any way wish to be restricted to the exact quantities, proportions, etc., given in the preferred examples of catalyst manufacture since these may be varied and yet my catalyst would be obtained. Nor do I wish to be limited in their utilization to the preferred examples of methanol manufacture which I have given by way of illustration. I have used these catalysts under many varying conditions and find that wide limits of pressure and temperature are permissible. All the factors such as, temperature, S. V. H., pressure, etc., may be varied within wide limits in order to secure the various S. T. Y.'s or percent conversions which may be desired for mechanical and thermal control or for manufacturing economies.

These catalysts have given excellent results with gas mixtures wherein the proportion of hydrogen to carbon-monoxide was less as well as greater than that of the preferred examples. My catalyst will form methanol from a gas mixture having any ratio of hydrogen to carbon monoxide, but if the ratio is below one to one by volume the S. T. Y. will be considerably lower than that obtained with hydrogen in excess by volume. In general I prefer not to use less hydrogen than that required theoretically by the equation $$2H_2 + CO = CH_3OH$$

I have found that a gas containing about four volumes of hydrogen to each volume of carbon monoxide gives the best results, and that with about 6 volumes of hydrogen the S. T. Y. is somewhat lower. For economic reasons I therefore prefer not to exceed 6 volumes of hydrogen for each volume of carbon monoxide, but I do not wish to be limited to this amount since methanol will be formed with the higher hydrogen ratios.

These catalysts are suited for the methanol synthesis at temperatures of between 150° C. and 400° C. although I have found the best results to be obtained at about 300° C. to 330° C. Within the temperature limits of 150° C. to 400° C. methanol will be formed in substantial amounts by these catalysts at pressures of five atmospheres and upwards dependent on the temperature used. Substantial yields of methanol may even be obtained at pressures lower than five atmospheres, for example, one atmosphere by operating at temperatures below 200° C. Under such conditions, however, the S. T. Y. is in general so much lower that the process would not be economical. In general I prefer to operate at pressures between about 50 and 400 atmospheres.

The above catalysts will form methanol within the above pressure, and temperature limitations at practically any S. V. H. I prefer, and have utilized, S. V. H.'s. ranging from 2000 to 20,000.

Claims:

1. A catalyst for the synthesis of methanol from hydrogen and carbon monoxide which comprises copper and a fluoride of a metal of the group consisting of calcium, barium, strontium and magnesium.

2. A catalyst for the synthesis of methanol from hydrogen and carbon monoxide which comprises copper and calcium fluoride.

3. A catalyst for the production of methanol from hydrogen and carbon monoxide which comprises copper and a fluoride of a metal of the group consisting of calcium, barium, strontium and magnesium formed by reduction of cupric oxide in an intimate admixture with the fluoride.

4. A catalyst for the production of methanol from hydrogen and carbon monoxide which comprises a mixture of copper and a fluoride of a metal of the group consisting of calcium, borium, strontium and magnesium prepared by precipitating cupric oxide and the fluoride, and then reducing the cupric oxide to metallic copper in the mixed precipitate.

5. A catalyst for the production of methanol from hydrogen and carbon monoxide which comprises copper and calcium fluoride formed by reduction of cupric oxide in an intimate admixture with calcium fluoride.

6. A catalyst for the production of methanol from hydrogen and carbon monoxide which comprises a mixture of copper and calcium fluoride prepared by coprecipitating cupric oxide and calcium fluoride, and then reducing the cupric oxide to metallic copper in the mixed precipitate.

7. Process for the production of methanol which comprises passing a gaseous mixture of hydrogen and carbon monoxide over a heated catalyst comprising copper and a fluoride of a metal of the group consisting of calcium, barium, strontium and magnesium.

8. Process for the production of methanol which comprises passing a gaseous mixture of hydrogen and carbon monoxide at pressures above atmospheric over a heated catalyst comprising copper and a fluoride of a metal of the group consisting of calcium, barium, strontium and magnesium.

9. Process for the production of methanol which comprises passing a gaseous mixture of hydrogen and carbon monoxide under pressures of between 5 and 400 atmospheres over a heated catalyst comprising copper and a fluoride of a metal of the group consisting of calcium, barium, strontium and magnesium.

10. Process for the production of methanol which comprises passing a gaseous mixture of hydrogen and carbon monoxide, containing an excess of hydrogen, under pressures of between 5 and 400 atmospheres over a heated catalyst comprising copper and a fluoride of a metal of the group consisting of calcium, barium, strontium and magnesium.

11. Process for the production of methanol which comprises passing a gaseous mixture of hydrogen and carbon monoxide at pressures above atmospheric over a heated catalyst comprising a mixture of copper and a fluoride of a metal of the group consisting of calcium, barium, strontium and magnesium prepared by coprecipitating cupric oxide and the fluoride and then reducing the cupric oxide to metallic copper in the mixed precipitate.

12. Process for the production of methanol which comprises passing a gaseous mixture of hydrogen and carbon monoxide under pressures of between 5 and 400 atmospheres over a heated intimate mixture of copper and a fluoride of a metal of the group consisting of calcium, barium, strontium and magnesium prepared by coprecipitating cupric oxide and the fluoride and then reducing the cupric oxide to metallic copper in the mixed precipitate.

13. Process for the production of methanol which comprises passing a gaseous mixture of hydrogen and carbon monoxide under pressure of over 5 atmospheres over a heated catalyst comprising copper and calcium fluoride.

14. Process for the production of methanol which comprises passing a gaseous mixture of hydrogen and carbon monoxide at pressures above atmospheric over a heated catalyst comprising copper and calcium fluoride formed by reduction of precipitated cupric oxide in an intimate admixture with coprecipitated calcium fluoride.

15. Process for the production of methanol which comprises passing a gaseous mixture of hydrogen and carbon monoxide, containing an excess of hydrogen, at pressures above atmospheric over a heated catalyst comprising copper and calcium fluoride formed by reduction of precipitated cupric oxide in an intimate admixture with coprecipitated calcium fluoride.

16. Process for the production of methanol which comprises passing a gaseous mixture of hydrogen and carbon monoxide at a pressure of between 5 and 400 atmospheres over a catalyst comprising copper and a fluoride of a metal of the group consisting of calcium, barium, strontium and magnesium, said catalyst being maintained at a temperature of between 150° C. and 400° C.

17. Process for the production of methanol which comprises passing a gaseous mixture of hydrogen and carbon monoxide containing an excess of hydrogen at a pressure of between 5 and 400 atmospheres over a catalyst comprising copper and a fluoride of a metal of the group consisting of calcium, barium, strontium and magnesium, said catalyst being maintained at a temperature of between 150° C. and 400° C.

18. Process for the production of methanol which comprises passing a gaseous mixture of hydrogen and carbon monoxide, containing an excess of hydrogen, at a pressure of about 200 atmospheres over a catalyst comprising copper and a fluoride of a metal of the group consisting of calcium, barium, strontium and magnesium, while maintaining said catalyst at a temperature of between 300 and 330° C.

19. Process for the production of methanol which comprises passing a gaseous mixture of hydrogen and carbon monoxide at a pressure of between 5 and 400 atmospheres over a catalyst comprising copper and calcium fluoride, said catalyst being maintained at a temperature of between 150° C. and 400° C.

20. Process for the production of methanol which comprises passing a gaseous mixture of hydrogen and carbon monoxide, containing an excess of hydrogen, at a pressure of about 200 atmospheres over a catalyst comprising copper and calcium fluoride, while maintaining said catalyst at a temperature of between 300 and 330° C.

Signed at Perth Amboy in the county of Middlesex and State of New Jersey this 12th day of May, A. D. 1927.

HENRY HERMAN STORCH.